US008644206B2

(12) United States Patent
Krishnaswamy et al.

(10) Patent No.: US 8,644,206 B2
(45) Date of Patent: Feb. 4, 2014

(54) AD HOC SERVICE PROVIDER CONFIGURATION FOR BROADCASTING SERVICE INFORMATION

(75) Inventors: Dilip Krishnaswamy, Del Mar, CA (US); Atul Suri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 811 days.

(21) Appl. No.: 11/861,280

(22) Filed: Sep. 26, 2007

(65) Prior Publication Data

US 2009/0046676 A1 Feb. 19, 2009

Related U.S. Application Data

(60) Provisional application No. 60/956,658, filed on Aug. 17, 2007.

(51) Int. Cl.
*H04H 20/71* (2008.01)
(52) U.S. Cl.
USPC ............ 370/312; 370/338; 370/400; 370/401
(58) Field of Classification Search
USPC ......... 370/310, 328, 338, 312, 315, 343, 345, 370/351, 389, 400, 401
See application file for complete search history.

(56) References Cited

U.S. PATENT DOCUMENTS

| | | | |
|---|---|---|---|
| 5,263,121 A | 11/1993 | Melsa et al. | |
| 5,301,359 A | 4/1994 | Van Den Heuvel et al. | |
| 5,999,813 A | 12/1999 | Lu et al. | |
| 6,125,185 A | 9/2000 | Boesch | |
| 6,295,453 B1 | 9/2001 | Desgagne et al. | |
| 6,650,900 B1 | 11/2003 | Chavez, Jr. et al. | |
| 6,735,417 B2 | 5/2004 | Fonseca et al. | |
| 6,871,071 B2 | 3/2005 | Takao et al. | |
| 6,961,575 B2 | 11/2005 | Stanforth | |
| 6,970,422 B1 | 11/2005 | Ho et al. | |
| 7,003,117 B2 | 2/2006 | Kacker et al. | |
| 7,046,647 B2 | 5/2006 | Oba et al. | |
| 7,110,372 B2 | 9/2006 | Kovacs et al. | |

(Continued)

FOREIGN PATENT DOCUMENTS

| | | |
|---|---|---|
| CN | 1342377 A | 3/2002 |
| CN | 1360795 A | 7/2002 |

(Continued)

OTHER PUBLICATIONS

Sethom et al: "Secure and seamless mobility support in heterogeneous wireless networks" Global Telecommunications Conference 2005, Globecom '05. IEEE St. Loius, MO, USA, Nov. 28-Dec. 2, 2005, Psicataway, NJ, USA, IEEE. vol. 6, Nov. 28, 2005, pp. 34.

(Continued)

*Primary Examiner* — Chi Pham
*Assistant Examiner* — Weibin Huang
(74) *Attorney, Agent, or Firm* — Howard Seo

(57) ABSTRACT

An ad hoc service provider includes a processing system configured to enable access by one or more mobile clients to a first wireless network via a second wireless network. The processing system is further configured to assemble service information for broadcasting to one or more mobile clients. The service information includes attributes of access to the first wireless network, the access being offered by the ad hoc service provider to one or more mobile clients.

25 Claims, 5 Drawing Sheets

(56) References Cited

U.S. PATENT DOCUMENTS

| | | |
|---|---|---|
| 7,123,908 B2 | 10/2006 | Chandler |
| 7,161,914 B2 | 1/2007 | Shoaib et al. |
| 7,170,878 B2 | 1/2007 | Fukuda |
| 7,254,119 B2 | 8/2007 | Jiang et al. |
| 7,266,374 B2 | 9/2007 | Kim |
| 7,266,383 B2 | 9/2007 | Anderson |
| 7,295,532 B2 * | 11/2007 | Haller et al. ............... 370/328 |
| 7,313,363 B2 | 12/2007 | Davis et al. |
| 7,339,915 B2 | 3/2008 | Jakkahalli |
| 7,346,167 B2 | 3/2008 | Billhartz et al. |
| 7,362,731 B2 | 4/2008 | Vinayakray-Jani |
| 7,363,050 B2 | 4/2008 | Nakano |
| 7,394,826 B2 | 7/2008 | Cain et al. |
| 7,408,929 B2 | 8/2008 | Adachi et al. |
| 7,420,952 B2 | 9/2008 | Da Costa et al. |
| 7,444,152 B2 | 10/2008 | Wu et al. |
| 7,486,651 B2 | 2/2009 | Hagiwara et al. |
| 7,496,363 B2 | 2/2009 | Salkintzis |
| 7,519,071 B2 | 4/2009 | Thubert et al. |
| 7,551,576 B2 * | 6/2009 | Ahmavaara ............... 370/328 |
| 7,552,234 B2 | 6/2009 | Thubert et al. |
| 7,573,904 B2 | 8/2009 | Pichna et al. |
| 7,624,267 B2 | 11/2009 | Huang et al. |
| 7,649,872 B2 | 1/2010 | Naghian et al. |
| 7,664,049 B1 | 2/2010 | Arrakoski et al. |
| 7,680,079 B2 * | 3/2010 | Jeong et al. ............... 370/331 |
| 7,881,474 B2 | 2/2011 | Sun |
| 7,903,817 B2 | 3/2011 | Cam-Winget et al. |
| 7,929,460 B2 | 4/2011 | Chen et al. |
| 7,933,247 B2 | 4/2011 | Gidwani |
| 8,014,368 B2 | 9/2011 | Kim et al. |
| 2001/0012757 A1 * | 8/2001 | Boyle ............... 455/11.1 |
| 2001/0024443 A1 | 9/2001 | Alriksson et al. |
| 2002/0039367 A1 * | 4/2002 | Seppala et al. ............... 370/401 |
| 2002/0080738 A1 | 6/2002 | Kim et al. |
| 2002/0138635 A1 | 9/2002 | Redlich et al. |
| 2002/0181447 A1 | 12/2002 | Hashizume et al. |
| 2002/0198019 A1 | 12/2002 | Naim et al. |
| 2003/0054796 A1 | 3/2003 | Tamaki et al. |
| 2003/0101263 A1 | 5/2003 | Bouillet et al. |
| 2003/0103521 A1 | 6/2003 | Raphaeli et al. |
| 2003/0157951 A1 | 8/2003 | Hasty, Jr. |
| 2003/0169697 A1 | 9/2003 | Suzuki et al. |
| 2003/0198346 A1 | 10/2003 | Meifu et al. |
| 2003/0202476 A1 | 10/2003 | Billhartz et al. |
| 2003/0203741 A1 | 10/2003 | Matsuo et al. |
| 2003/0212802 A1 * | 11/2003 | Rector et al. ............... 709/228 |
| 2003/0235174 A1 | 12/2003 | Pichna et al. |
| 2004/0001442 A1 | 1/2004 | Rayment et al. |
| 2004/0008663 A1 | 1/2004 | Srikrishna et al. |
| 2004/0068571 A1 | 4/2004 | Ahmavaara |
| 2004/0087268 A1 | 5/2004 | Hatano |
| 2004/0171386 A1 * | 9/2004 | Mitjana ............... 455/452.2 |
| 2004/0174822 A1 | 9/2004 | Bui |
| 2004/0235452 A1 | 11/2004 | Fischer |
| 2004/0235481 A1 | 11/2004 | Shimizu |
| 2004/0266439 A1 | 12/2004 | Lynch, Jr. et al. |
| 2005/0053005 A1 | 3/2005 | Cain et al. |
| 2005/0088980 A1 | 4/2005 | Olkkonen et al. |
| 2005/0094588 A1 | 5/2005 | Wentink |
| 2005/0136834 A1 | 6/2005 | Bonta et al. |
| 2005/0138671 A1 | 6/2005 | Love et al. |
| 2005/0163078 A1 | 7/2005 | Oba et al. |
| 2005/0197098 A1 | 9/2005 | Trossen |
| 2005/0228853 A1 | 10/2005 | Yamamura et al. |
| 2005/0243719 A1 | 11/2005 | Haverinen et al. |
| 2005/0254472 A1 | 11/2005 | Roh et al. |
| 2005/0286476 A1 | 12/2005 | Crossswy et al. |
| 2006/0005008 A1 | 1/2006 | Kao |
| 2006/0007863 A1 | 1/2006 | Naghian |
| 2006/0009248 A1 | 1/2006 | Sakamoto et al. |
| 2006/0056368 A1 | 3/2006 | Ratiu et al. |
| 2006/0064589 A1 | 3/2006 | Taniguchi et al. |
| 2006/0092939 A1 | 5/2006 | Duggi et al. |
| 2006/0098598 A1 | 5/2006 | Gallagher |
| 2006/0101400 A1 | 5/2006 | Capek et al. |
| 2006/0114825 A1 | 6/2006 | McAuley et al. |
| 2006/0143026 A1 | 6/2006 | Jagannathan et al. |
| 2006/0176852 A1 | 8/2006 | Wu et al. |
| 2006/0178149 A1 | 8/2006 | Kamat et al. |
| 2006/0215576 A1 | 9/2006 | Yu et al. |
| 2006/0217062 A1 | 9/2006 | Saffre et al. |
| 2006/0229080 A1 | 10/2006 | Khan et al. |
| 2006/0236105 A1 | 10/2006 | Brok et al. |
| 2006/0240828 A1 | 10/2006 | Jain et al. |
| 2006/0258391 A1 | 11/2006 | Lee |
| 2007/0008902 A1 | 1/2007 | Yaramada et al. |
| 2007/0042769 A1 | 2/2007 | Thommana et al. |
| 2007/0097906 A1 | 5/2007 | Kato |
| 2007/0110009 A1 | 5/2007 | Bachmann et al. |
| 2007/0111705 A1 | 5/2007 | Zhang et al. |
| 2007/0149139 A1 | 6/2007 | Gauvreau |
| 2007/0172040 A1 | 7/2007 | Cesarini et al. |
| 2007/0206527 A1 | 9/2007 | Lo et al. |
| 2007/0220219 A1 | 9/2007 | Bansal et al. |
| 2007/0223408 A1 | 9/2007 | Thielke et al. |
| 2007/0234061 A1 | 10/2007 | Teo |
| 2007/0253376 A1 * | 11/2007 | Bonta et al. ............... 370/338 |
| 2007/0254614 A1 * | 11/2007 | Muralidharan et al. ...... 455/307 |
| 2007/0291722 A1 | 12/2007 | Lee |
| 2008/0040481 A1 | 2/2008 | Joshi et al. |
| 2008/0046542 A1 | 2/2008 | Sano |
| 2008/0049689 A1 | 2/2008 | Nakfour et al. |
| 2008/0069105 A1 | 3/2008 | Costa et al. |
| 2008/0080387 A1 * | 4/2008 | Wang et al. ............... 370/252 |
| 2008/0081606 A1 | 4/2008 | Cole |
| 2008/0089288 A1 | 4/2008 | Anschutz et al. |
| 2008/0095134 A1 | 4/2008 | Chen et al. |
| 2008/0112355 A1 | 5/2008 | Krishnakumar et al. |
| 2008/0112362 A1 | 5/2008 | Korus |
| 2008/0165735 A1 | 7/2008 | Chen et al. |
| 2008/0192666 A1 | 8/2008 | Koskan et al. |
| 2009/0046591 A1 | 2/2009 | Krishnaswamy et al. |
| 2009/0046598 A1 | 2/2009 | Krishnaswamy et al. |
| 2009/0046644 A1 | 2/2009 | Krishnaswamy et al. |
| 2009/0046658 A1 | 2/2009 | Krishnaswamy |
| 2009/0046861 A1 | 2/2009 | Krishnaswamy |
| 2009/0047930 A1 | 2/2009 | Krishnaswamy et al. |
| 2009/0047964 A1 | 2/2009 | Krishnaswamy |
| 2009/0047966 A1 | 2/2009 | Krishnaswamy et al. |
| 2009/0049158 A1 | 2/2009 | Krishnaswamy et al. |
| 2009/0073943 A1 | 3/2009 | Krishnaswamy et al. |
| 2009/0125429 A1 | 5/2009 | Takayama |
| 2009/0172391 A1 | 7/2009 | Kasapidis |
| 2010/0034131 A1 | 2/2010 | Kasapi et al. |
| 2010/0173631 A1 | 7/2010 | Kim et al. |
| 2011/0019627 A1 | 1/2011 | Krishnaswamy et al. |
| 2011/0026477 A1 | 2/2011 | Sinivaara et al. |
| 2012/0027001 A1 | 2/2012 | Krishnaswamy et al. |

FOREIGN PATENT DOCUMENTS

| | | |
|---|---|---|
| CN | 1435027 A | 8/2003 |
| CN | 1602109 A | 3/2005 |
| CN | 1736041 A | 2/2006 |
| CN | 1741485 A | 3/2006 |
| CN | 1747449 A | 3/2006 |
| CN | 1921418 A | 2/2007 |
| CN | 1929384 A | 3/2007 |
| CN | 1961531 A | 5/2007 |
| DE | 10208689 | 9/2003 |
| DE | 1005021315 | 12/2005 |
| EP | 1289200 | 3/2003 |
| EP | 1445893 A2 | 8/2004 |
| EP | 1458151 | 9/2004 |
| EP | 1178644 B1 | 7/2006 |
| EP | 1677462 A1 | 7/2006 |
| EP | 1701486 | 9/2006 |
| EP | 1761082 A1 | 3/2007 |
| EP | 1775972 A1 | 4/2007 |
| GB | 2398462 | 8/2001 |
| GB | 2388276 | 11/2003 |
| GB | 2408173 | 5/2005 |
| JP | 2000115171 A | 4/2000 |

(56) References Cited

FOREIGN PATENT DOCUMENTS

| | | |
|---|---|---|
| JP | 2001275145 A | 10/2001 |
| JP | 2002544727 A | 12/2002 |
| JP | 2003070068 A | 3/2003 |
| JP | 2003101553 A | 4/2003 |
| JP | 2003143644 A | 5/2003 |
| JP | 2004153529 A | 5/2004 |
| JP | 2004519911 A | 7/2004 |
| JP | 2004253885 A | 9/2004 |
| JP | 2004264976 A | 9/2004 |
| JP | 2005500766 A | 1/2005 |
| JP | 2005502273 A | 1/2005 |
| JP | 2005033808 A | 2/2005 |
| JP | 2005176021 A | 6/2005 |
| JP | 2005204213 A | 7/2005 |
| JP | 2005523666 A | 8/2005 |
| JP | 2005295310 A | 10/2005 |
| JP | 2005531958 A | 10/2005 |
| JP | 2005536131 A | 11/2005 |
| JP | 2005348397 A | 12/2005 |
| JP | 2005536913 A | 12/2005 |
| JP | 2006013811 A | 1/2006 |
| JP | 2006502670 A | 1/2006 |
| JP | 2006041633 A | 2/2006 |
| JP | 2006050224 A | 2/2006 |
| JP | 2006505987 A | 2/2006 |
| JP | 2006074621 A | 3/2006 |
| JP | 2006163793 A | 6/2006 |
| JP | 2006197462 A | 7/2006 |
| JP | 2006304005 A | 11/2006 |
| JP | 2007036828 A | 2/2007 |
| JP | 2007074382 A | 3/2007 |
| JP | 2007505553 A | 3/2007 |
| JP | 2007508781 A | 4/2007 |
| JP | 2007116710 A | 5/2007 |
| JP | 2007129380 A | 5/2007 |
| JP | 2007143066 A | 6/2007 |
| JP | 2007522725 A | 8/2007 |
| JP | 2007528162 A | 10/2007 |
| JP | 2009500958 | 1/2009 |
| JP | 2009500984 A | 1/2009 |
| JP | 2009526418 A | 7/2009 |
| JP | 4504934 | 7/2010 |
| JP | 2010537575 | 12/2010 |
| KR | 1020070034060 | 3/2007 |
| RU | 2192049 C1 | 10/2002 |
| RU | 2206177 C1 | 6/2003 |
| RU | 2273050 C2 | 3/2006 |
| RU | 2301444 | 6/2007 |
| TW | I242937 B | 11/2005 |
| TW | I243620 | 11/2005 |
| TW | I246005 B | 12/2005 |
| TW | I246344 B | 12/2005 |
| WO | 9013211 | 11/1990 |
| WO | 0069186 | 11/2000 |
| WO | WO0199053 A2 | 12/2001 |
| WO | 02063900 | 8/2002 |
| WO | WO0263990 A1 | 8/2002 |
| WO | WO0271084 A1 | 9/2002 |
| WO | WO02096132 A1 | 11/2002 |
| WO | WO03017705 A1 | 2/2003 |
| WO | WO03090847 A2 | 11/2003 |
| WO | 2004002208 A2 | 1/2004 |
| WO | WO2004004226 A2 | 1/2004 |
| WO | WO2004017549 A2 | 2/2004 |
| WO | WO2004017568 A1 | 2/2004 |
| WO | WO2004034219 A2 | 4/2004 |
| WO | 2004043008 A1 | 5/2004 |
| WO | WO2004107656 A1 | 12/2004 |
| WO | WO2005036348 A2 | 4/2005 |
| WO | WO2005072183 A2 | 8/2005 |
| WO | 2005086468 A1 | 9/2005 |
| WO | WO2005088874 A1 | 9/2005 |
| WO | WO2005109693 A1 | 11/2005 |
| WO | WO2005116841 A1 | 12/2005 |
| WO | WO2006000239 A1 | 1/2006 |
| WO | WO2006024343 A1 | 3/2006 |
| WO | 2006043902 | 4/2006 |
| WO | WO2006043901 | 4/2006 |
| WO | 2006068878 A1 | 6/2006 |
| WO | WO2006061682 A1 | 6/2006 |
| WO | WO2006117738 A1 | 11/2006 |
| WO | 2007004051 | 1/2007 |
| WO | 2007008751 A1 | 1/2007 |
| WO | WO2007008574 | 1/2007 |
| WO | WO2007024932 | 3/2007 |
| WO | WO2007047118 A2 | 4/2007 |
| WO | 2007052249 | 5/2007 |
| WO | 2007064249 | 6/2007 |
| WO | WO2007090176 | 8/2007 |
| WO | WO2007091699 | 8/2007 |
| WO | 2008063728 | 5/2008 |
| WO | WO2009026192 | 2/2009 |
| WO | WO2010000870 A1 | 1/2010 |

OTHER PUBLICATIONS

Dimitriadis et al: "Seamless continuity of real-time video across umts and wlan networks: challenges and performance evaluation" IEEE Personal Communications, IEEE Communications Society, US, vol. 12, No. 3, Jun. 1, 2005, pp. 8-18, XP011134871.

Ashutosh et al.: "Seamless proactive handover across heterogeneous access networks" Wirless Personal Communciations, Kluwer Academic Publishers, DO, vol. 43, No. 3, Jun. 28, 2007, pp. 837-855, XP019557974.

Ming et al.: "Ad hoc assisted handoff for real-time voice in IEEE 802.11 infrastructure WLANs" Wireless Communications and Networks Conference, 2004. WCNC. 2004 IEEE Atlanta, GA, USA Mar. 21-25, 2004, Piscaraway, NJ, USA, IEEE, vol. 1, Mar. 21, 2004, pp. 202-206.

Bharat et al.: "Integrating Heterogeneous Wireless Technologies: A Cellular Aided Mobile Ad Hoc Network (CAMA)" Mobile Networks and Applications, Kluwer Academic Publishers, BO, vol. 9, No. 4, Aug. 1, 2004, pp. 393-408, XP019213788.

European Search Report—EP08006429, European Search Authority—The Hague—Nov. 26, 2008.

International Search Report—PCT/US08/072863, International Search Authority—European Patent Office—Dec. 4, 2008.

Written Opinion—PCT/US08/072863, International Search Authority—European Patent Office—Dec. 4, 2008.

Cradlepoint Technology, "CTR350 Mobile Broadband Travel Router: Ethernet, USB Modem Support", Dec. 2008.

Cradlepoint Technology, "CTR500 Mobile Broadband Router: Ethernet, USB, and ExpressCard Modem Support" Dec. 2008.

Fon Wiki Beta, "Alien, Linus and Bill", http://wiki.fon.com/wiki/alien2%_linus_and_Bill, Feb. 27, 2009.

Fon Wiki Beta, "FON Spot", http://wiki.fon.com/wiki/FON_Spot.

Kyocera, "KR1 Mobile Router: Technical Specifications" 2006 Kyocera Wireless Corp.

Dilip Krishnaswamy: "AWiMA: an Architecture for Adhoc Wireless Mobile Internet Access" Global Telecommunications Conference, 2008. IEEE Globecom 2008., Nov. 30, 2008, pp. 1-5, XP031370766 IEEE, Piscataway, NJ, USA ISBN: 978-1-4244-2324-8 abstract; figure 1 p. 2, col. 1, paragraph 3—p. 3, col. 2, paragraph 3.3.2; figure 2.

Sengupta S, et al., "Dynamic pricing for service provisioning and network selection in heterogeneous networks" Physical Communication, vol. 2, No. 1-2, 39-43 Mar. 1, 2009, pp. 138-150, XP026110196 ISSN: 1874-4907 [retrieved on Mar. 9, 2009] abstract.

Ying Qiu, Peter Marbach: "Bandwidth Allocation in Ad Hoc Networks: a Price-Based Approach" IEEE Infocom 2003, [Online] Jul. 3, 2003, pp. 1-11, XP002603370 infocom 2003 Retrieved from the Internet: URL:http://www.i eee-infocom.org/2003/paper s/20_01.PDF> [retrieved on Oct. 4, 2010] p. 1, col. 1, line 9, paragraph 1—p. 4, col. 1, line 20, paragraph II. E p. 9, col. 2, line 5, paragraph VIII—p. 11, col. 1, line 18, paragraph IX.

Taiwan Search Report—TW097131335—TIPO—Dec. 12, 2011.

Park, Mirang et al., "A Study of a Seamless User Authentication Protocol on Wireless LAN Systems," Journal of the Information

(56) References Cited

OTHER PUBLICATIONS

Processing Society of Japan, The Information Processing Society of Japan, Jul. 15, 2006, 47(7), pp. 2058-2070.

* cited by examiner

AD HOC SERVICE PROVIDER CONFIGURATION FOR BROADCASTING SERVICE INFORMATION

CLAIM OF PRIORITY UNDER 35 U.S.C. §119

The present Application for Patent claims priority to Provisional Application No. 60/956,658 entitled, "METHOD FOR A HETEROGENEOUS WIRELESS AD HOC MOBILE SERVICE PROVIDER" filed Aug. 17, 2007, and assigned to the assignee hereof and hereby expressly incorporated by reference herein.

FIELD

The present disclosure relates generally to telecommunications, and more specifically to an ad hoc service provider configuration for broadcasting service information.

BACKGROUND

Wireless telecommunication systems are widely deployed to provide various services to consumers, such as telephony, data, video, audio, messaging, broadcasts, etc. These systems continue to evolve as market forces drive wireless telecommunications to new heights. Today, wireless networks are providing broadband Internet access to mobile subscribers over a regional, a nationwide, or even a global region. Such networks are sometimes referred as Wireless Wide Area Networks (WWANs). WWAN operators generally offer wireless access plans to their subscribers such as subscription plans at a monthly fixed rate.

Accessing WWANs from all mobile devices may not be possible. Some mobile devices may not have a WWAN radio. Other mobile devices with a WWAN radio may not have a subscription plan enabled. Ad hoc networking allows mobile devices to dynamically connect over wireless interfaces using protocols such as WLAN, Bluetooth, UWB or other protocols. There is a need in the art for a methodology to allow a user of a mobile device without WWAN access to dynamically subscribe to wireless access service provided by a user with a WWAN-capable mobile device using wireless ad hoc networking between the mobile devices belong to the two users.

SUMMARY

In one aspect of the disclosure, an ad hoc service provider includes a processing system configured to enable access by one or more mobile clients to a first wireless network via a second wireless network. The processing system is further configured to assemble service information for broadcasting to one or more mobile clients. The service information includes attributes of access to the first wireless network, the access being offered by the ad hoc service provider to one or more mobile clients.

In another aspect of the disclosure, an ad hoc service provider includes means for enabling access by one or more mobile clients to a first wireless network via a second wireless network. The ad hoc service provider further includes means for assembling service information for broadcasting to one or more mobile clients. The service information includes attributes of access to the first wireless network, the access being offered by the ad hoc service provider to the one or more mobile clients.

In a further aspect of the disclosure, a method of providing service information from an ad hoc service provider configured to enable access by one or more mobile clients to a first wireless network via a second wireless network includes assembling service information for broadcasting to one or more mobile clients. The service information includes attributes of access to the first wireless network, the access being offered by the ad hoc service provider to one or more mobile clients.

In yet a further aspect of the disclosure, a machine-readable medium including instructions executable by a processing system in an ad hoc service provider includes code for enabling access by one or more mobile clients to a first wireless network via a second wireless network. The instructions further include code for assembling service information for broadcasting to one or more mobile clients. The service information includes attributes of access to the first wireless network, the access being offered by the ad hoc service provider to one or more mobile clients.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

DETAILED DESCRIPTION

The detailed description set forth below in connection with the appended drawings is intended as a description of various configurations of the present invention and is not intended to represent the only configurations in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention.

Figure 1:
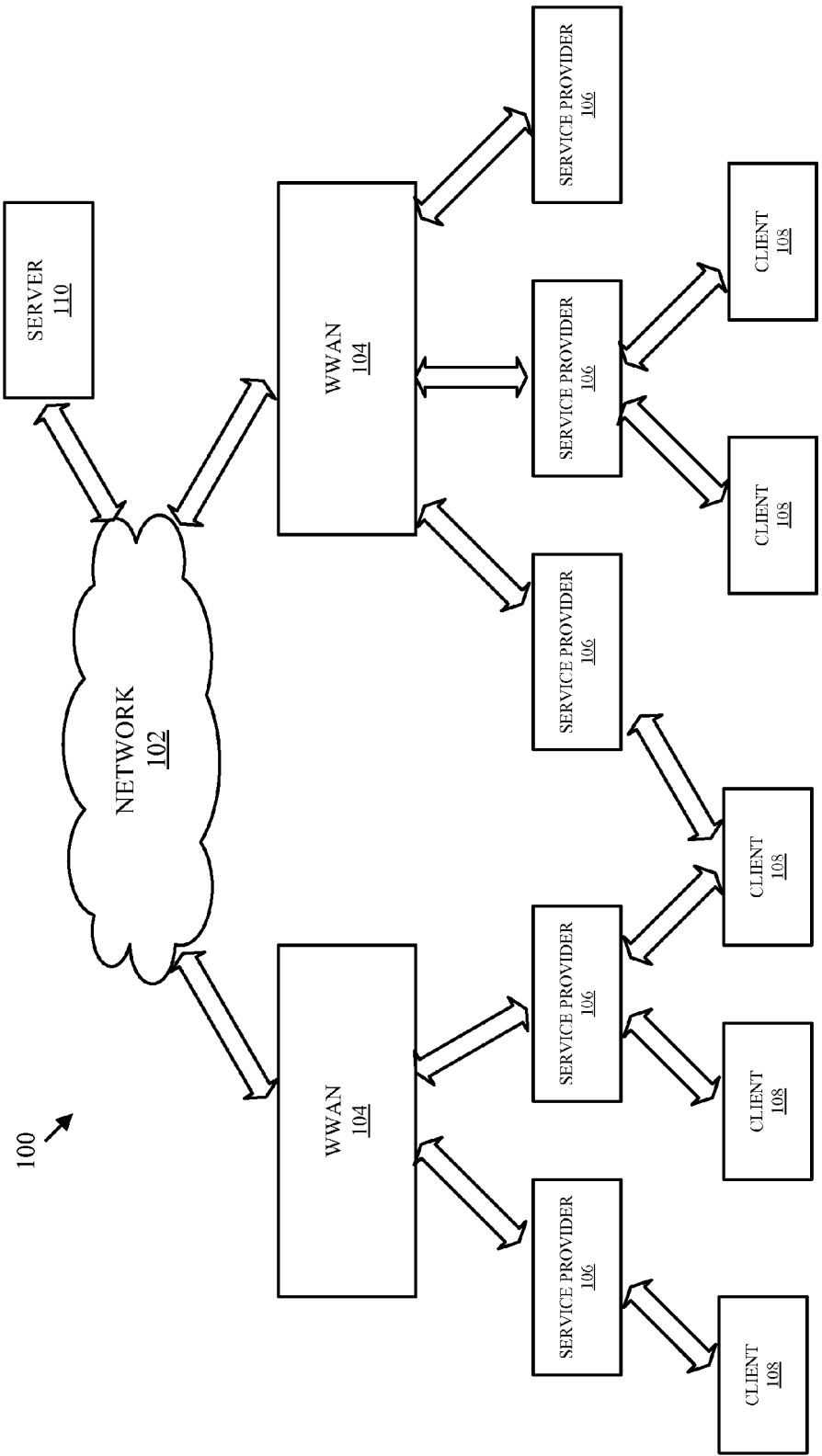
FIG. 1 is a conceptual block diagram illustrating an example of a telecommunications system.

FIG. 1 is a conceptual block diagram illustrating an example of a telecommunications system. The telecommunications system 100 is shown with multiple WWANs 104 that provide broadband access to a network 102 for mobile subscribers. The network 102 may be a packet-based network such as the Internet or some other suitable network. For clarity of presentation, two WWANs 104 are shown with a backhaul connection to the network 102. However, the number of WWANs providing broadband access to network 102 is not limited to two WWANs. Each WWAN 104 may be implemented with multiple fixed-site base stations (not shown) dispersed throughout a geographic region. The geographic region may be generally subdivided into smaller regions known as cells. Each base station may be configured to serve all mobile subscribers within its respective cell. A base station controller (not shown) may be used to manage and coordinate the base stations in the WWAN 104 and support the backhaul connection to the network 102.

Each WWAN 104 may use one of many different wireless access protocols to support radio communications with mobile subscribers. By way of example, one WWAN 104 may support Evolution-Data Optimized (EV-DO), while the other WWAN 104 may support Ultra Mobile Broadband (UMB). EV-DO and UMB are air interface standards promulgated by the 3rd Generation Partnership Project 2 (3GPP2) as part of the CDMA2000 family of standards and employ multiple access techniques such as Code Division Multiple Access (CDMA) to provide broadband Internet access to mobile subscribers. Alternatively, one of the WWANs 104 may support Long Term Evolution (LTE), which is a project within the 3GPP2 to improve the Universal Mobile Telecommunications System (UMTS) mobile phone standard based primarily on a Wideband CDMA (W-CDMA) air interface. One of the WWANs 104 may also support the WiMAX standard being developed by the WiMAX forum. The actual wireless access protocol employed by a WWAN for any particular telecommunications system will depend on the specific application and the overall design constraints imposed on the system. The various techniques presented throughout this disclosure are equally applicable to any combination of heterogeneous or homogeneous WWANs regardless of the wireless access protocols utilized.

Each WWAN 104 has a number of mobile subscribers. Each subscriber may have a mobile node capable of accessing the network 102 directly through the WWAN 104. The mobile nodes access the WWAN 104 shown in the telecommunications system in FIG. 1 using an EV-DO, UMB or LTE wireless access protocol; however, in actual implementations, these mobile nodes may be configured to support any wireless access protocol.

One or more of the mobile nodes may be configured to create in its vicinity an ad hoc network based on the same or a different wireless access protocol used to access the WWAN 104. By way of example, a mobile node may support a UMB wireless access protocol with a WWAN, while providing an IEEE 802.11 access point for other mobile nodes that cannot directly access a WWAN. IEEE 802.11 denotes a set of Wireless Local Access Network (WLAN) standards developed by the IEEE 802.11 committee for short-range communications (e.g., tens of meters to a few hundred meters). Although IEEE 802.11 is a common WLAN wireless access protocol, other suitable protocols may be used.

A mobile node that may be used to provide an access point for another mobile node will be referred to herein as a "ad hoc service provider" and is represented in FIG. 1 as a service provider 106. A mobile node that may use an access point of an ad hoc service provider 106 will be referred to herein as a "mobile client" and is represented in FIG. 1 as a client 108. A mobile node, whether an ad hoc service provider 106 or a client 108, may be a laptop computer, a mobile telephone, a personal digital assistant (PDA), a mobile digital audio player, a mobile game console, a digital camera, a digital camcorder, a mobile audio device, a mobile video device, a mobile multimedia device, or any other device capable of supporting at least one wireless access protocol.

The ad hoc service provider 106 may extend its wireless broadband network access service to mobile clients 108 that would otherwise not have access to the network 102. A server 110 may be used as an "exchange" to enable mobile clients 108 to purchase unused bandwidth from ad hoc service providers 106 to access, for example, the network 102 across WWANs 104.

An ad hoc service provider 106, a server 110, and one or more mobile clients 108 may establish a network that is an ad hoc heterogeneous wireless network. By way of example, a heterogeneous wireless network may include at least two types of wireless networks (e.g., a WWAN and a WLAN). By way of example, an ad hoc network may be a network whose specific configuration may change from time to time or from the formation of one network to the next. The network configuration is not pre-planned prior to establishing the network. Examples of configurations for an ad hoc network may include a configuration as to which members are to be in the network (e.g., which ad hoc service provider, which server, and/or which mobile client(s) are to be included in a network), a configuration as to the geographic locations of an ad hoc service provider and mobile client(s), and a configuration as to when and how long a network is to be established.

For illustrative purposes only, exemplary scenarios of ad hoc networks are described below. Scenario 1: While a mobile subscriber is at an airport on Tuesday 8 am, he may turn on his mobile node (e.g., a laptop computer or a mobile telephone), use it as an ad hoc service provider while he is waiting for his flight, and establish an ad hoc network for thirty minutes. The ad hoc network may include one or more mobile clients (e.g., other laptop computers or mobile telephones) in the vicinity. Scenario 2: On Wednesday 5 pm, while the mobile subscriber is at a hotel, he may use the same mobile node as an ad hoc service provider to form another ad hoc network for four hours, providing its service to the same mobile clients, different mobile clients, or a combination of both. Scenario 3: On Wednesday 5 pm, a different ad hoc service provider may form an ad hoc network at the airport where the first ad hoc service provider was the day before. Because the service providers and clients are mobile, an ad hoc network can be a "mobile" network.

The server 110 may be a centralized server or a distributed server. The centralized server may be a dedicated server or integrated into another entity such as a desktop or laptop computer, or a mainframe. The distributed server may be distributed across multiple servers and/or one or more other entities such as laptop or desktop computers, or mainframes. In at least one configuration, the server 110 may be integrated, either in whole or in part, into one or more ad hoc service providers.

In one configuration of a telecommunications system 100, the server 110 charges the mobile clients 108 based on usage. For the occasional user of mobile Internet services, this may be an attractive alternative to the monthly fixed rate wireless access plans. The revenue generated from the usage charges may be allocated to the various entities in the telecommunications system 100 in a way that tends to perpetuate the vitality of the exchange. By way of example, a portion of the revenue may be distributed to the ad hoc service providers, thus providing a financial incentive for mobile subscribers to become ad hoc service providers. Another portion of the revenue may be distributed to the WWAN operators to compensate them for the bandwidth that would otherwise go unutilized. Another portion of the revenue may be distributed to the manufacturers of the mobile nodes. The remainder of the revenue could be kept by the server operator that provides the exchange. The server 110, which may be a centralized server as shown or a distributed server including multiple servers, may be used to determine how to allocate revenue generated from the mobile clients 108 to the various entities in the telecommunications system 100.

The server 110 may be implemented as a trusted server. It can therefore be authenticated, for example, using a Public Key Infrastructure (PKI) certificate in a Transport Layer Security (TLS) session between the server 110 and an ad hoc service provider 106, or between the server 110 and a mobile client 108. Alternatively, the server 110 may be authenticated using self-signed certificates or by some other suitable means.

Regardless of the manner in which the server 110 is authenticated, a secure session channel may be established between the server 110 and an ad hoc service provider 106, or between the server 110 and a mobile client 108, during registration. In one configuration of a telecommunications system 100, a mobile client 108 may register with the server 110 to set up a user name and password with payment information. An ad hoc service provider 106 may register with the server 110 to notify its desire to provide a wireless access point to the network 102 (e.g., an Internet access point) to mobile clients 108.

The server 110 may also be used to provide admission control. Admission control is the process whereby the server 110 determines whether to allow an ad hoc service provider 106 to provide service within a geographic location. The server 110 may limit the number of ad hoc service providers 106 at a given location if it determines that additional ad hoc service providers 106 will adversely affect performance in the WWAN. Additional constraints may be imposed by the WWAN operators that may not want its mobile subscribers to provide service in a given geographic location depending on various network constraints.

The server 110 may also be used to manage dynamic sessions that are established between the ad hoc service providers 106 and the mobile clients 108. In one configuration of the telecommunications system 100, Extensible Authentication Protocol-Tunneled Transport Layer Security (EAP-TTLS) may be used for Authentication, Authorization and Accounting (AAA) and secure session establishment for a connection initiated by an ad hoc service provider 106 with the server 110 when the ad hoc service provider 106 is mobile and desires to provide service. EAP-TTLS may also be used for a session initiation request by a mobile client 108. In the latter case, the mobile client 108 is the supplicant, the ad hoc service provider 106 is the authenticator, and the server 110 is the authentication server. The ad hoc service provider 106 sends the mobile client's credentials to the server 110 for EAP-AAA authentication. The EAP-TTLS authentication response from the server 110 is then used to generate a Master shared key. Subsequently, a link encryption key may be established between the ad hoc service provider 106 and the mobile client 108.

Additional security may be achieved with a Secure Sockets Layer Virtual Private Network (SSL VPN) tunnel between a mobile client 108 and the server 110. The SSL VPN tunnel is used to encrypt traffic routed through an ad hoc service provider 106 to provide increased privacy for a mobile client 108. Alternatively, the tunnel may be an IPsec tunnel or may be implemented using some other suitable tunneling protocol.

Once the tunnel is established between the server 110 and the mobile client 108, various services may be provided. By way of example, the server 110 may support audio or video services to the mobile client 108. The server 110 may also support advertising services to the mobile client 108. Other functions of the server 110 include providing routing to and from the network for mobile client 108 content as well as providing network address translation to and from the network for mobile client 108.

The server 110 may also provide support for a handoff of a mobile client 108 from one ad hoc service provider 106 to another based on any number of factors. These factors may include, by way of example, the quality of service (QoS) required by each mobile client 108, the duration of the session required by each mobile client 108, and the loading, link conditions, and energy level (e.g., battery life) at the ad hoc service provider 106.

The server 110 also may be used to store a goodness metric for each ad hoc service provider 106. The goodness metric reflects the level of service an ad hoc service provider 106 has provided during previous access sessions with mobile clients 108. The server 110 may monitor each session between an ad hoc service provider 106 and a mobile client 108 and update the goodness metric associated with the ad hoc service provider 106 based on one or more factors. The factors may include, but are not limited to, the duration of the access session and the average bandwidth of access to the WWAN 104 provided to the mobile client 108. Monitored factors may be assigned a value from a range of values for each session. The goodness metric for the session may be the sum or average of these values. As an ad hoc service provider 108 provides more access sessions to mobile clients 108, the goodness metric associated with the ad hoc service provider may be continually updated by averaging the goodness metrics from prior access sessions. This average may be a straight average or it may be weighted to favor more recent access sessions.

Figure 2:
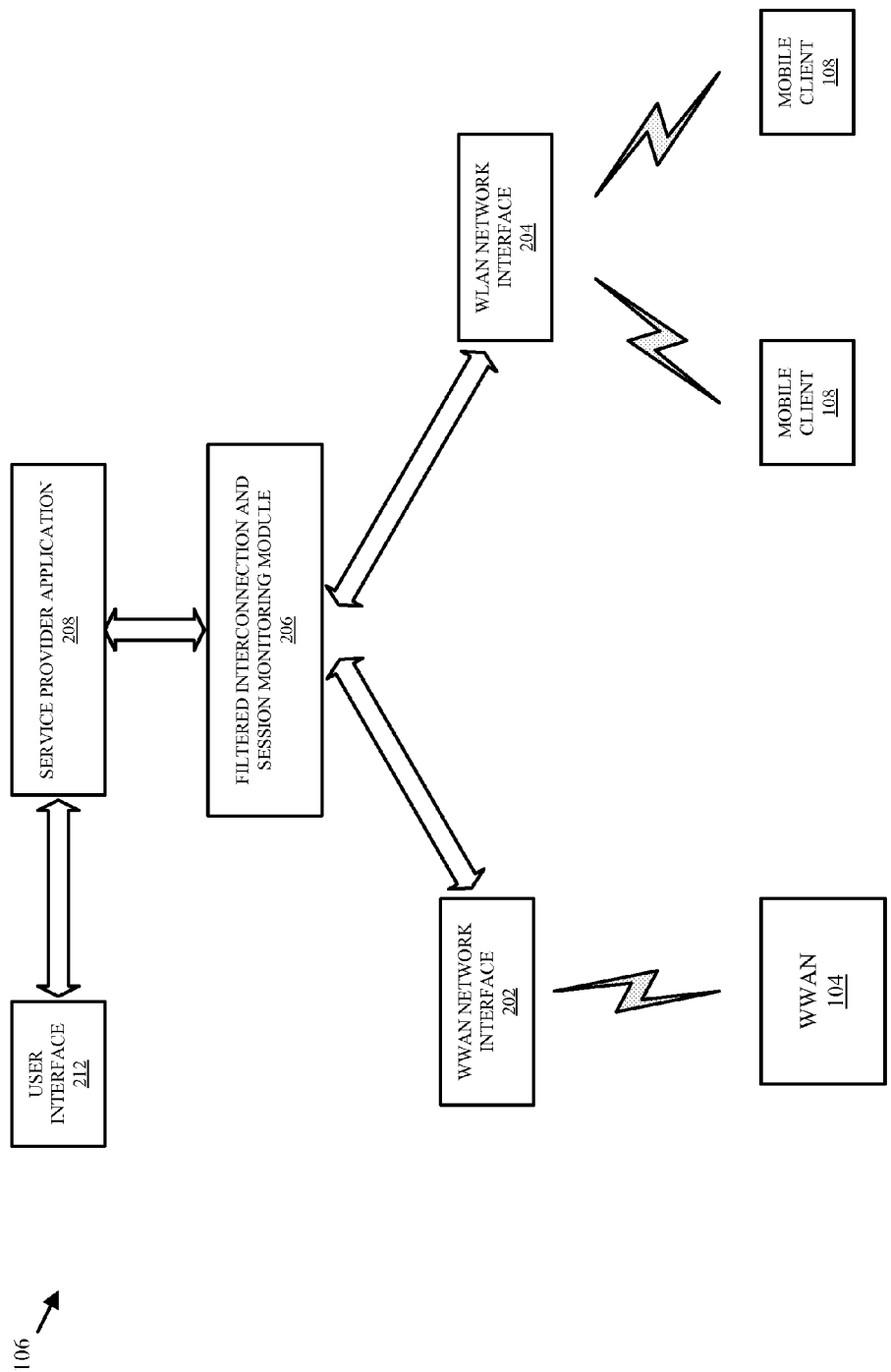
FIG. 2 is a conceptual block diagram illustrating an example of the functionality of an ad hoc service provider.

FIG. 2 is a conceptual block diagram illustrating an example of the functionality of an ad hoc service provider 106. The ad hoc service provider 106 has the ability to bridge wireless links over homogeneous or heterogeneous wireless access protocols. This may be achieved with a WWAN network interface 202 that supports a wireless access protocol for a WWAN to the network 102, and a WLAN network interface 204 that provides a wireless access point for mobile clients 108. By way of example, the WWAN network interface 202 may include a transceiver function that supports EV-DO for Internet access through a WWAN 104, and the WLAN network interface 204 may include a transceiver function that provides an 802.11 access point for mobile clients 108. Each network interface 202, 204 may be configured to implement the physical layer by demodulating wireless signals and performing other radio frequency (RF) front end processing. Each network interface 202, 204 may also be configured to implement the data link layer by managing the transfer of data across the physical layer.

The ad hoc service provider 106 is shown with a filtered interconnection and session monitoring module 206. The module 206 provides filtered processing of content from mobile clients 108 so that the interconnection between the ad hoc wireless link and the WWAN network interface 202 is provided only to mobile clients 108 authenticated by the server. The module 206 is also responsible for monitoring the sessions between the server and the authenticated mobile clients 108. The module 206 also maintains tunneled connectivity between the server and the authenticated mobile clients 108.

The ad hoc service provider 106 also includes a service provider application 208 that (1) enables the module 206 to provide ad hoc services to mobile clients 108, and (2) supports WWAN or Internet access to a mobile subscriber or user of the ad hoc service provider 106. The latter function is supported by a user interface 212 that communicates with the WWAN network interface 202 through the module 206 under control of the service provider application 208. The user interface 212 may include a keypad, display, speaker, microphone, joystick, and/or any other combination user interface devices that enable a mobile subscriber or user to access the WWAN 104 or the network 102 (see FIG. 1).

As discussed above, the service provider application 208 also enables the module 206 to provide ad hoc services to mobile clients 108. The service provider application 208 maintains a session with the server 110 to exchange custom messages with the server. In addition, the service provider application 208 also maintains a separate session with each mobile client 108 for exchanging custom messages between the service provider application 208 and the mobile client 108. The service provider application 208 provides information on authenticated and permitted clients to the filtered interconnection and session monitoring module 206.

The filtered interconnection and session monitoring module 206 allows content flow for only authenticated and permitted mobile clients 108. The filtered interconnection and session monitoring module 206 also optionally monitors information regarding content flow related to mobile clients 108 such as the amount of content outbound from the mobile clients and inbound to the mobile clients, and regarding WWAN and WLAN network resource utilization and available bandwidths on the wireless channels. The filtered interconnection and session monitoring module 206 can additionally and optionally provide such information to the service provider application 208. The service provider application 208 can optionally act on such information and take appropriate actions such as determining whether to continue maintaining connectivity with the mobile clients 108 and with the server, or whether to continue to provide service. It should be noted that the functions described in connection with module 206 and service provider application 208 can be implemented in any given platform in one or multiple sets of modules that coordinate to provide such functionality at the ad hoc service provider 106.

When the ad hoc service provider 106 decides to provide the ad hoc services, the service provider application 208 sends a request to the server 110 for approval. The service provider application 208 requests authentication by the server 110 and approval from the server 110 to provide service to one or more mobile clients 108. The server 110 may authenticate the ad hoc service provider 106 and then determine whether it will grant the ad hoc service provider's request. As discussed earlier, the request may be denied if the number of ad hoc service providers in the same geographic location is too great or if the WWAN operator has imposed certain constraints on the ad hoc service provider 106.

Once the ad hoc service provider 106 is authenticated, the service provider application 208 may advertise service information for the ad hoc service provider. The service provider application 208 may also prompt changes to the advertised service information as conditions change. Interested mobile clients 108 may associate with an Service Set Identifier (SSID) to access the ad hoc service provider 106. The service provider application 208 may then route authentication messages between the mobile clients 108 with the server 110 and configure the filtered interconnection and session monitoring module 206 to connect the mobile clients 108 to the server once authenticated. During the authentication of a mobile client 108, the service provider application 208 may use an unsecured wireless link.

The service provider application 208 may manage the mobile client 108 generally, and the session specifically, through the user interface 212. Alternatively, the service provider application 208 may support a seamless operation mode with processing resources being dedicated to servicing mobile clients 108. In this way, the mobile client 108 is managed in a way that is transparent to the mobile subscriber. The seamless operation mode may be desired where the mobile subscriber does not want to be managing mobile clients 108, but would like to continue generating revenue by sharing bandwidth with mobile clients 108.

Although not shown, the ad hoc service provider 106 may also include a server application. The server application may be used to enable the ad hoc service provider 106 to function as a server to authenticate mobile clients 108.

Figure 3:
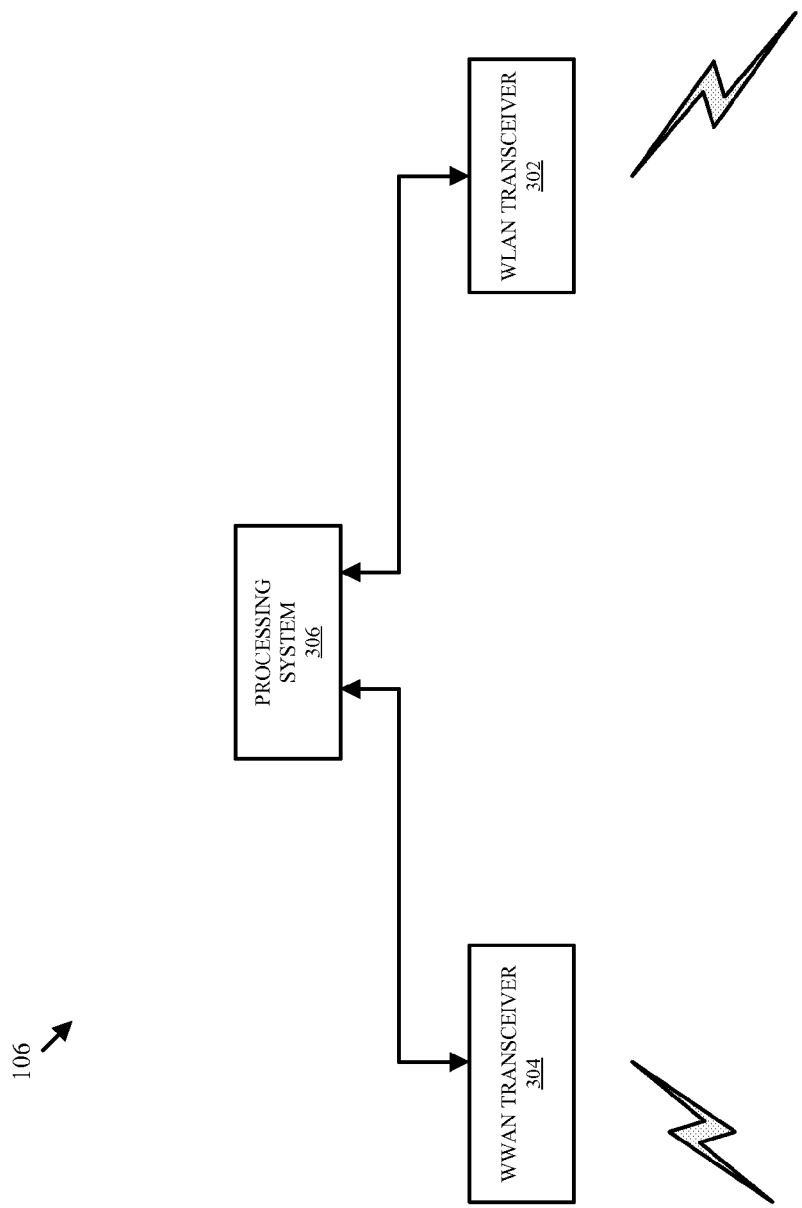
FIG. 3 is a conceptual block diagram illustrating an example of a hardware configuration for an ad hoc service provider.

FIG. 3 is a conceptual block diagram illustrating an example of a hardware configuration for an ad hoc service provider. The ad hoc service provider 106 is shown with a WLAN transceiver 302, a WWAN transceiver 304, and a processing system 306. By way of example, the WLAN transceiver 302 may be used to implement the analog portion of the physical layer for the WLAN network interface 202 (see FIG. 2), and the WWAN transceiver 304 may be used to implement the analog portion of the physical layer for the WWAN network interface 204 (see FIG. 2).

The processing system 306 may be used to implement the digital processing portion of the physical layer, as well as the link layer, for both the WLAN and the WWAN network adaptors 202 and 204 (see FIG. 2). The processing system 306 may also be used to implement the filtered interconnection and session monitoring module 206 and the service provider application 208 (see FIG. 2).

The processing system 306 may be implemented using software, hardware, or a combination of both. By way of example, the processing system 306 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The processing system 306 may also include one or more machine-readable media for storing software. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media may include storage integrated into a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 306.

The functionality of the processing system 306 for one configuration of an ad hoc service provider 106 will now be presented with reference to FIG. 1. Those skilled in the art will readily appreciate that other configurations of the ad hoc service provider 106 may include a processing system 306 that has the same or different functionality.

Turning to FIG. 1, the processing system in the ad hoc service provider 106 provides a means for enabling access by one or more mobile clients 108 to a first wireless network, represented by a WWAN 104, via a second wireless network, represented by a WLAN comprising the one or more mobile clients 108 and the ad hoc service provider functioning as a wireless access point to the WLAN. The processing system may enable this access by implementing the filtered interconnection and session monitoring module 206 and the service provider application 208, as represented in FIG. 2 to bridge the wireless links associated with the WWAN 104 and the WLAN having different wireless access protocols (e.g., EV-DO and 802.11).

The processing system in the ad hoc service provider 106 may function to establish the wireless access point when authorized by the server 110. When the processing system decides to establish a wireless access point for one or more mobile clients 108, it sends a request to the server 110 for approval. The processing system requests authentication by the server 110 and approval from the server 110 to provide service to one or more mobile clients 108. The server 110 may authenticate the ad hoc service provider 106 and then determine whether it will grant the ad hoc service provider's request. As discussed earlier, the request may be denied if the number of ad hoc service providers in the same geographic location is too great or if the WWAN operator has imposed certain constraints on the ad hoc service provider 106.

Once the ad hoc service provider 106 is authenticated and approved to provide service to one or more mobile clients 108, the ad hoc service provider 106 may advertise its availability to provide access to the WWAN 104 by assembling and broadcasting service information to mobile clients 108 within range of its WLAN transceiver 302. The service information may include parameters for accessing the WLAN established with the ad hoc service provider 106 as a wireless access point as well as attributes of the access to the WWAN 104 offered by the ad hoc service provider 106. The parameters of access to the WLAN may include an ad hoc Service Set Identifier (SSID), supported data rates, data security mechanisms, as well as other parameters used by the mobile client 108 to associate and establish a wireless link with the ad hoc service provider. The SSID may be set to include characters identifying the ad hoc service provider 106 as a mobile node offering access to a WWAN 104.

The attributes of access to the WWAN 104 offered by the ad hoc service provider 106 may include information to enable a mobile client 108 to determine whether the ad hoc service provider 106 is providing sufficient access to the WWAN 104 to meet the needs of the mobile client 108 and to select the ad hoc service provider 106 if acceptable to the mobile client 108. The attributes of access may include the previously discussed goodness metric associated with the ad hoc service provider 106, fee rates of access to the WWAN 104, and/or one or more quality of service parameters. The quality of service parameters include, but are not limited to, an expected data rate of access to the WWAN 104, an expected duration of access to the WWAN 104, a latency of access to the WWAN 104, a frequency of access to the WWAN 104, and an amount of transferred data with respect to the WWAN 104.

The expected duration of access to the WWAN 104 is a user-specified period of time reflecting an amount of time a mobile subscriber anticipates making an ad hoc service provider 106 available at a particular geographic location such as an airport terminal, hotel lobby, sports venue, etc. The expected duration of access may be communicated to the server 110 when the ad hoc service provider 106 is authenticated and approved by the server 110 to provide access to the WWAN 104.

The expected data rate of access to the WWAN 104 via the wireless link between the ad hoc service provider 106 and the WWAN 104 may vary depending on the wireless access protocol used within the WWAN 104, the signal strength of the wireless link between the ad hoc service provider 106 and the WWAN 104, and the amount of concurrent data traffic within the WWAN 104. The ad hoc service provider 106 may be configured to monitor the average data rate of access to the WWAN 104 available to the ad hoc service provider 106. Based on this average data rate, an expected average data rate of access to the WWAN 104 available to a mobile client 108 through the ad hoc service provider 106 is determined.

The expected average data rate of access to the WWAN 104 may be set as a percentage of the total available data rate available to the ad hoc service provider 106 or it may be set to a user-specified amount by the mobile subscriber offering access through the ad hoc service provider 106. In an alternative configuration, the server 110 may set the expected average data rate when the ad hoc service provider 106 is authenticated and approved to provide service. The server 110 may set the expected average data rate using information received from the ad hoc service provider 106 when approval was requested and based on an agreement reached with the mobile subscriber regarding the level of service to be provided.

Both the expected duration of access and the expected data rate of access to the WWAN 104 are dynamic attributes. For example, the expected duration of access to the WWAN 104 may be set when the ad hoc service provider 106 is authenticated and approved to provide service with the server 110. The expected duration will decrease to reflect the amount of time the ad hoc service provider 106 has been available to provide access to a mobile client 108 since the ad hoc service provider 106 was authenticated and approved by the server 110. Optionally, the mobile subscriber may update the amount of time the mobile service subscriber 106 will be available to provide access. The mobile service subscriber 106 may be required to re-authenticate and request approval from the server 110 to continue providing service once the initially set period to time expires.

The expected data rate of access to the WWAN 104 also may change while the ad hoc service provider 106 is available to provide access. For example, the overall data rate available to the ad hoc service provider 106 may vary due to changes in traffic on the WWAN 104. Similarly, the expected data rate of access may be partially utilized by a first mobile client 108 when subsequent mobile clients 108 seek access to the WWAN 104. The expected data rate of access to the WWAN 104 may be modified to take these changes into account.

The latency and frequency of access to the WWAN 104 refer to operating details of the access offered by the ad hoc service provider to the mobile client. For example, the latency and frequency of access may refer to the latency of packet access, the frequency of packet transmission, the duration of packet transmission, the packet length, etc. available to the mobile client during a given session. Varying these parameters varies the priority associated with associated access sessions available to mobile clients. Accordingly, a mobile client may select access offered by an ad hoc service provider that provides access priority to the WWAN 104 suitable for the applications being used by the mobile client.

The amount of transferred data refers to an amount of data transmitted and/or received by a mobile client when accessing the WWAN 104 during an access session. The amount of transferred data may indicate the maximum amount of data that a mobile client is permitted to receive and/or transmit via WWAN 104 in a single access session. The amount of transferred data may refer to bytes per session or bytes per a specified period of time.

The fee rate of access to the WWAN 104 is the cost per unit time incurred by a mobile client 108 when accessing the WWAN 104 via a WLAN established by the ad hoc service provider 106. The fee rate may include a range of fee rates covering different periods of time. The fee rate also may include a range of fees associated with different combinations of quality of service parameters discussed above. The fee rate for access to the WWAN 104 may be provided by the server 110 to the ad hoc service provider 106 at the time of authentication and approval for providing access to the WWAN 104. Alternatively, the mobile subscriber may set or adjust the fee rate independent of the server 110.

The processing system 306 may be used to provide means for receiving one or more of the foregoing attributes of access to the WWAN 104 from the server 110. The processing system 306 may execute code to request and/or receive attributes from the server 110. These attributes may include the goodness metric associated with the ad hoc service provider 106 and a fee rate of access to the WWAN 104. The code may be implemented in a standalone application or it may be part of a larger application incorporating other functionality. For example, the code may be executed within the processing system when an ad hoc service provider 106 is authenticated and approved by the server 110 to provide access to the WWAN 104.

The processing system 306 may be used to provide means for dynamically updating one or more attributes of access to the WWAN 104 offered by the ad hoc service provider 106 based on the status of the ad hoc service provider 106. The processing system 306 may execute code to monitor factors affecting one or more attributes and to adjust the attributes based on monitored changes in the factors. As discussed above, such attributes may include the expected duration of access and the expected data rate of access to the WWAN 104. The code may be implemented in a standalone application or it may be part of a larger application incorporating other functionality. For example, the code may be executed within the processing system 306 continuously while the ad hoc service provider 106 is made available to offer access to the WWAN 104.

The processing system 306 in the ad hoc service provider 106 may be configured to provide a means for assembling the service information discussed above for broadcasting to one or more mobile clients 108. The parameters and attributes mentioned above may be stored within the processing system 306. The processing system 306 may execute code to retrieve each of the parameters and attributes and assemble them into a format suitable for broadcasting to one or more mobile clients 108 using the WLAN transceiver 302. For example, a driver for the WLAN network interface 204 may be modified to assemble the parameters and attributes into a beacon frame that is subsequently transmitted using WLAN transceiver 302.

Beacon frames are a common feature in wireless access protocols to notify mobile nodes within a specified range of the availability of a wireless network access point. A beacon frame may include fields whose contents are dictated by the wireless access protocol as well as fields that are vender-specific or user-specific to allow for custom applications. The parameters of access to the WLAN may be automatically incorporated into fields of the beacon frame specified by the wireless access protocol used within the WLAN. The processing system 306 may be configured to incorporate one or more of the attributes of access to the WWAN 104 into the user-specified fields.

The processing system 306 also may be configured to incorporate one or more attributes of access to the WWAN 104 into a parameter of access to the WLAN. For example, the SSID of the WLAN may not use all of the available bytes of the beacon frame. The processing system 306 may be configured to incorporate one or more attributes of access to the WWAN 104 into the SSID of the WLAN. The number of attributes that may be incorporated into the SSID will vary depending on the data size of the SSID and the data size of the attributes.

Once construction of the beacon frame is complete, WLAN transceiver 302 broadcasts the beacon frame to mobile clients 108 within range of the transceiver.

Figure 4:
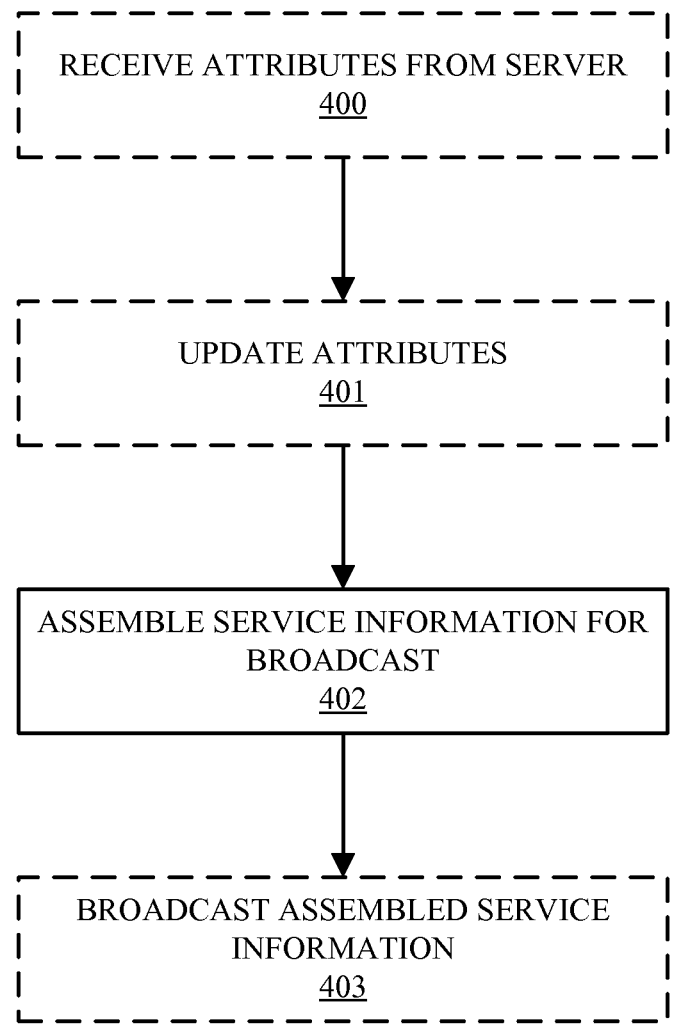
FIG. 4 is a flowchart illustrating an example of a method for providing service information from an ad hoc service provider.

FIG. 4 is a flowchart illustrating an example of a method for providing service information from an ad hoc service provider 106 to enable access to a WWAN 104. For implementations in which attributes are received from server 110, the processing system 306 of the ad hoc service provider 106 receives such attributes in step 400. For implementations in which attributes are updated dynamically based on the status of the ad hoc service provider 106, the processing system 306 of the ad hoc service provider 106 updates the attributes in step 401. In step 402, the processing system 306 assembles the service information, which includes both parameters of access to the WLAN and attributes of access to the WWAN 104, into a format suitable for broadcasting to one or more mobile clients 108. In step 403, the assembled service information is broadcast to the mobile clients 108 using the WLAN transceiver 302.

Upon receiving the service information broadcast by the ad hoc service provider 106, the mobile clients 108 may be configured to parse the assembled service information to identify the various parameters of access to the WLAN and the attributes of access to the WWAN 104. The parameters and attributes may be displayed within a graphical user interface on the mobile client 108 to allow a mobile user to view the attributes of access to the WWAN 104 being offered by the ad hoc service provider. Based on the broadcast attributes, a mobile user can determine whether or not the offered access to the WWAN 104 is sufficient for the mobile user's desired applications. For example, the mobile user may require access for a minimum period of time or intend on using a data-intensive application requiring a high data rate. Furthermore, the mobile user can gain information on the reliability of the particular ad hoc service provider 106 based on the associated goodness metric. Additionally, if multiple ad hoc service providers 106 are within range of the mobile client 108, the mobile client may be configured to display the attributes of all available ad hoc service providers 106 thereby allowing the mobile user to compare the different ad hoc service providers and select one that best suits their needs.

Mobile clients 108 interested in the access offered by an ad hoc service provider 106 may associate with the broadcast SSID to access the ad hoc service provider 106. The processing system in the ad hoc service provider 106 may then authenticate the mobile clients 108 with the server 110 and then set up an interconnection bridge from the WLAN link to the mobile clients 108 over to the WWAN link. During the authentication of a mobile client 108, the processing system in the ad hoc service provider 106 may use an unsecured wireless link.

The processing system in the ad hoc service provider 106 may optionally choose to move a mobile client 108 to a new SSID with a secure link once the mobile client 108 is authenticated. In such situations, the ad hoc service provider 106 may distribute the time it spends in each SSID depending on the load that it has to support for existing sessions with mobile clients 108.

The processing system may also determine whether the ad hoc service provider 106 can support a mobile client 108 before allowing the mobile client 108 to access a network. Resource intelligence in the processing system that estimates the drain on the battery power and other processing resources that would occur by accepting a mobile client 108 may assist in determining whether the processing system should consider supporting a new mobile client 108 or accepting a handoff of that mobile client 108 from another ad hoc service provider 106.

The processing system in the ad hoc service provider 106 may admit mobile clients 108 and provides them with a certain QoS guarantee, such as an expected average bandwidth during a session. Average throughputs provided to each mobile client 108 over a time window may be monitored. The ad hoc service provider 106 may monitor the throughputs for all flows going through it to ensure that resource utilization by the mobile clients 108 is below a certain threshold, and that it is meeting the QoS requirement that it has agreed to provide to the mobile clients 108 during the establishment of the session.

The processing system in the ad hoc service provider 106 may also provide a certain level of security to the wireless access point by routing data between the mobile client 108 and the server without being able to decipher the data. Similarly, the processing system may be configured to ensure data routed between the user interface and the WWAN cannot be deciphered by mobile clients. The processing system may use any suitable encryption technology to implement this functionality.

The processing system in the ad hoc service provider 106 may also maintain a time period for a mobile client 108 to access a network. The time period may be agreed upon between the ad hoc service provider 106 and the mobile client 108 during the initiation of the session. If the processing system determines that it is unable to provide the mobile client 108 with access to the network for the agreed upon time period, then it may notify both the server 110 and the mobile client 108 regarding its unavailability. This may occur due to energy constraints (e.g., a low battery), or other unforeseen events. The server 110 may then consider a handoff of the mobile client to another ad hoc service provider 106, if there is such an ad hoc service provider 106 in the vicinity of the mobile client 108. The processing system in the ad hoc service provider 106 may support the handoff of the mobile client 108.

Turning now to the mobile client 108, a TLS session may be used by the mobile client 108 to register with the server 110. Once registered, the mobile client 108 may search for available ad hoc service providers 106. When the mobile client 108 detects the presence of one or more ad hoc service providers 106, it may initiate a session using EAP-TTLS with an ad hoc service provider 106 based on attributes and parameters such as the available bandwidth that the ad hoc service provider 106 can support, the goodness metric of the ad hoc service provider 106, and the cost of the service advertised. As described earlier, a link encryption key may be established between the mobile client 108 and the ad hoc service provider 106 during the establishment of the session. An SSL VPN session may be established between the mobile client 108 and the server 110 so that all traffic between the two is encrypted. The transport layer ports may be kept in the open and not encrypted to provide visibility for the network address translation functionality at the ad hoc service provider 106.

A handoff of a mobile client 108 from one ad hoc service provider to another may occur due to any of a number of factors. The handoff of the mobile client 108 may be performed in a variety of ways. In one configuration, the mobile client 108 may maintain a limited session with multiple ad hoc service providers 106, while using one ad hoc service provider 106 to access the Internet. As described earlier, this approach may facilitate the handoff process. In an alternative configuration, the mobile client 108 may consider a handoff only when necessary. In this configuration, the mobile client 108 may maintain an active list of ad hoc service providers 106 in its vicinity for handoff. The mobile client 108 may select an ad hoc service provider 106 for handoff from the active list when the current ad hoc service provider 106 needs to discontinue its service. When handoff is not possible, a mobile client 108 may need to reconnect through a different ad hoc service provider 106 to access the Internet.

If the bandwidth needs of a mobile client 108 are greater than the capabilities of the available ad hoc service providers 106, then the mobile client 108 may access multiple ad hoc service providers 106 simultaneously. A mobile client 108 with multiple transceivers could potentially access multiple ad hoc service providers 106 simultaneously using a different transceiver for each ad hoc service provider 106. If the same wireless access protocol can be used to access multiple ad hoc service providers 106, then different channels may be used. If the mobile client 108 has only one transceiver available, then it may distribute the time that it spends accessing each ad hoc service provider 106.

Figure 5:
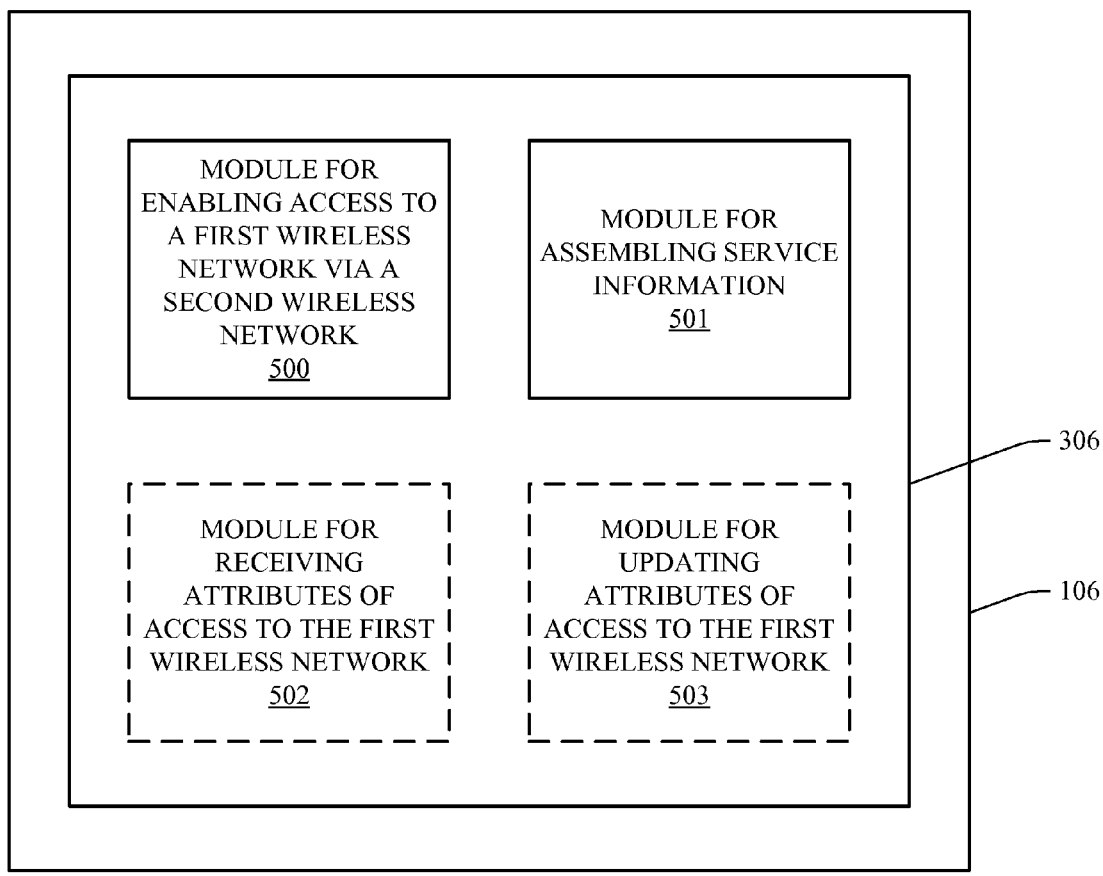
FIG. 5 is a conceptual block diagram of an exemplary configuration of an ad hoc service provider.

FIG. 5 is a conceptual block diagram of an exemplary configuration of an ad hoc service provider. This block diagram illustrates an example of the functionality of a processing system 306 in an ad hoc service provider 106. The ad hoc service provider 106 may be used to enable access by a mobile client to a first wireless network such as a WWAN 104 via a second wireless network, such as a WLAN supported by the ad hoc service provider. The ad hoc service provider may include a module 500 for enabling access to the first wireless network via the second wireless network. The processing system 306 also may include a module 501 for assembling service information for broadcasting to one or more mobile clients. The processing system 306 may include module 502 for receiving attributes of access to the first wireless network from a server and module 503 for updating attributes of access to the first wireless network based on the status of the ad hoc service provider 106.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in information of their functionality. Whether such functionality is implemented as hardware or software depends upon the particular application and design constraints imposed on the overall system. Skilled artisans may implement the described functionality in varying ways for each particular application.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An ad hoc service provider, comprising:
a processing system configured to enable access by one or more mobile clients to a first wireless network via a second wireless network, the processing system further configured to receive over the first wireless network and assemble service information for broadcasting to one or more mobile clients,
wherein the service information comprises attributes of access to the first wireless network relating to an ad hoc service provider advertised expectation of service, the access being offered by the ad hoc service provider to one or more mobile clients, wherein the ad hoc service provider is a mobile device.

2. The ad hoc service provider of claim 1, wherein the processing system is further configured to receive at least one attribute of access to the first wireless network from a server.

3. The ad hoc service provider of claim 1, wherein the processing system is further configured to dynamically update at least one attribute of access to the first wireless network based on a status of the ad hoc service provider.

4. The ad hoc service provider of claim 1, wherein the attributes of access to the first wireless network comprise at least one of a quality of service parameter and a fee rate of access to the first wireless network, and
wherein the quality of service parameter comprises at least one of an expected data rate of access to the first wireless network, an expected duration of access to the first wireless network, a latency of access to the first wireless network, a frequency of access to the first wireless network, and an amount of transferred data.

5. The ad hoc service provider of claim 1, wherein the attributes of access to the first wireless network comprise a service provider goodness metric based on prior access to the first wireless network provided by the ad hoc service provider to one or more mobile clients.

6. The ad hoc service provider of claim 1, wherein the processing system is further configured to construct a beacon frame suitable for broadcasting to one or more mobile clients, the beacon frame comprising the service information.

7. The ad hoc service provider of claim 1, wherein the service information further comprises parameters of access to the second wireless network comprising a service set identifier,
wherein the processing system is further configured to incorporate at least one attribute of access to the first wireless network into the service set identifier.

8. The ad hoc service provider of claim 1, further comprising a transceiver for broadcasting the assembled service information to one or more mobile clients.

9. An ad hoc service provider, comprising:
means for enabling access by one or more mobile clients to a first wireless network via a second wireless network; and
means for receiving over the first wireless network and assembling service information for broadcasting to one or more mobile clients,
wherein the service information comprises attributes of access to the first wireless network relating to an ad hoc service provider advertised expectation of service, the access being offered by the ad hoc service provider to the one or more mobile clients, wherein the ad hoc service provider is a mobile device.

10. The ad hoc service provider of claim 9, wherein the ad hoc service provider further comprises means for receiving at least one attribute of access to the first wireless network from a server.

11. The ad hoc service provider of claim 9, wherein the ad hoc service provider further comprises means for dynamically updating at least one attribute of access to the first wireless network based on a status of the ad hoc service provider.

12. The ad hoc service provider of claim 9, wherein the attributes of access to the first wireless network comprise at least one of a quality of service parameter and a fee rate of access to the first wireless network, and
wherein the quality of service parameter comprises at least one of an expected data rate of access to the first wireless network, an expected duration of access to the first wireless network, a latency of access to the first wireless network, a frequency of access to the first wireless network, and an amount of transferred data.

13. The ad hoc service provider of claim 9, wherein the attributes of access to the first wireless network comprise a service provider goodness metric based on prior access to the first wireless network provided by the ad hoc service provider to one or more mobile clients.

14. The ad hoc service provider of claim 9, wherein the means for assembling service information further constructs a beacon frame suitable for broadcasting to one or more mobile clients, the beacon frame comprising the service information.

15. The ad hoc service provider of claim 9, wherein the service information further comprises parameters of access to the second wireless network comprising a service set identifier,
wherein the means for assembling service information further incorporates at least one attribute of access to the first wireless network into the service set identifier.

16. The ad hoc service provider of claim 9, further comprising means for broadcasting the assembled service information to one or more mobile clients.

17. A method of providing service information from an ad hoc service provider configured to enable access by one or more mobile clients to a first wireless network via a second wireless network, the method comprising:

receiving over the first wireless network and assembling service information for broadcasting to one or more mobile clients, wherein the service information comprises attributes of access to the first wireless network relating to an ad hoc service provider advertised expectation of service, the access being offered by the ad hoc service provider to one or more mobile clients, wherein the ad hoc service provider is a mobile device.

18. The method of claim 17, further comprising receiving at least one attribute of access to the first wireless network from a server.

19. The method of claim 17, further comprising dynamically updating at least one attribute of access to the first wireless network based on a status of the ad hoc service provider.

20. The method of claim 17, wherein the attributes of access to the first wireless network comprise at least one of a quality of service parameter and a fee rate of access to the first wireless network, and wherein the quality of service parameter comprises at least one of an expected data rate of access to the first wireless network, an expected duration of access to the first wireless network, a latency of access to the first wireless network, a frequency of access to the first wireless network, and an amount of transferred data.

21. The method of claim 17, wherein the attributes of access to the first wireless network comprise a service provider goodness metric based on prior access to the first wireless network provided by the ad hoc service provider to one or more mobile clients.

22. The method of claim 17, wherein the assembling step further comprises constructing a beacon frame suitable for broadcasting to one or more mobile clients, the beacon frame comprising the service information.

23. The method of claim 17, wherein the service information further comprises parameters of access to the second wireless network comprising a service set identifier, wherein the assembling step further comprises incorporating at least one attribute of access to the first wireless network into the service set identifier.

24. The method of claim 17, further comprising broadcasting the assembled service information to one or more mobile clients.

25. A non-transitory computer readable medium comprising instructions executable by a processing system in an ad hoc service provider, the instructions comprising code for:

enabling access by one or more mobile clients to a first wireless network via a second wireless network; and receiving over the first wireless network and assembling service information for broadcasting to one or more mobile clients, wherein the service information comprises attributes of access to the first wireless network relating to an ad hoc service provider advertised expectation of service, the access being offered by the ad hoc service provider to one or more mobile clients, wherein the ad hoc service provider is a mobile device.

* * * * *